United States Patent [19]

Rhodes et al.

[11] Patent Number: 4,823,931

[45] Date of Patent: Apr. 25, 1989

[54] MAGNETIC CAN LANER

[75] Inventors: Keith J. Rhodes, Pontiac; Scott D. Voorheis, Drayton Plains, both of Mich.

[73] Assignee: Magnetic Products, Inc., Walled Lake, Mich.

[21] Appl. No.: 141,551

[22] Filed: Jan. 7, 1988

[51] Int. Cl.[4] .............................................. B65G 47/12
[52] U.S. Cl. ................................ 198/445; 198/446; 198/690.1
[58] Field of Search ............ 198/381, 445, 446, 690.1, 198/619

[56] References Cited

U.S. PATENT DOCUMENTS

| | | |
|---|---|---|
| 3,214,003 | 10/1965 | Wilson . |
| 3,285,386 | 11/1966 | Gorman . |
| 3,433,346 | 3/1969 | McCaskill . |
| 3,590,974 | 7/1971 | Loveless .......................... 198/381 |
| 3,666,080 | 5/1972 | Alfredsson . |
| 3,731,782 | 5/1973 | Del Rosso . |
| 3,738,475 | 6/1973 | Lee et al. . |
| 3,767,505 | 10/1973 | Coran et al. ....................... 198/381 |
| 4,113,142 | 9/1978 | Ryzhov et al. .................... 198/381 |
| 4,173,276 | 11/1979 | Raudat et al. ..................... 198/446 |
| 4,351,430 | 9/1982 | Mojden ........................... 198/690.1 |

FOREIGN PATENT DOCUMENTS

| | | | |
|---|---|---|---|
| 1964622 | 6/1978 | Fed. Rep. of Germany ...... 198/381 |
| 2700214 | 7/1978 | Fed. Rep. of Germany ...... 198/381 |
| 1129800 | 10/1968 | United Kingdom ............. 198/690.1 |
| 1280338 | 7/1972 | United Kingdom ................ 198/381 |

*Primary Examiner*—Joseph E. Valenza
*Attorney, Agent, or Firm*—Basile and Hanlon

[57] ABSTRACT

A magnetic article laner for use with a conveyor having a conveying surface carrying a plurality of magnetic articles randomly distributed in transverse positions on the conveying surface and moving in a generally horizontal planer path of travel includes magnetic members, disposed in a plane parallel to the path of travel and vertically spaced from the plurality of magnetic articles, for aligning the plurality of magnetic articles into a uniform transverse position defining a lane with a preselected linear path of travel. The magnetic members include north and south magnetic poles defining transverse boundaries of each magnetic lane, and an upstream portion of the magnetic lane has a greater magnetic field strength than a downstream portion of the magnetic lane. The plurality of magnetic articles are urged by divider members and magnetic forces to form an aligned row centered between the north and south magnetic poles of each magnetic lane.

16 Claims, 2 Drawing Sheets

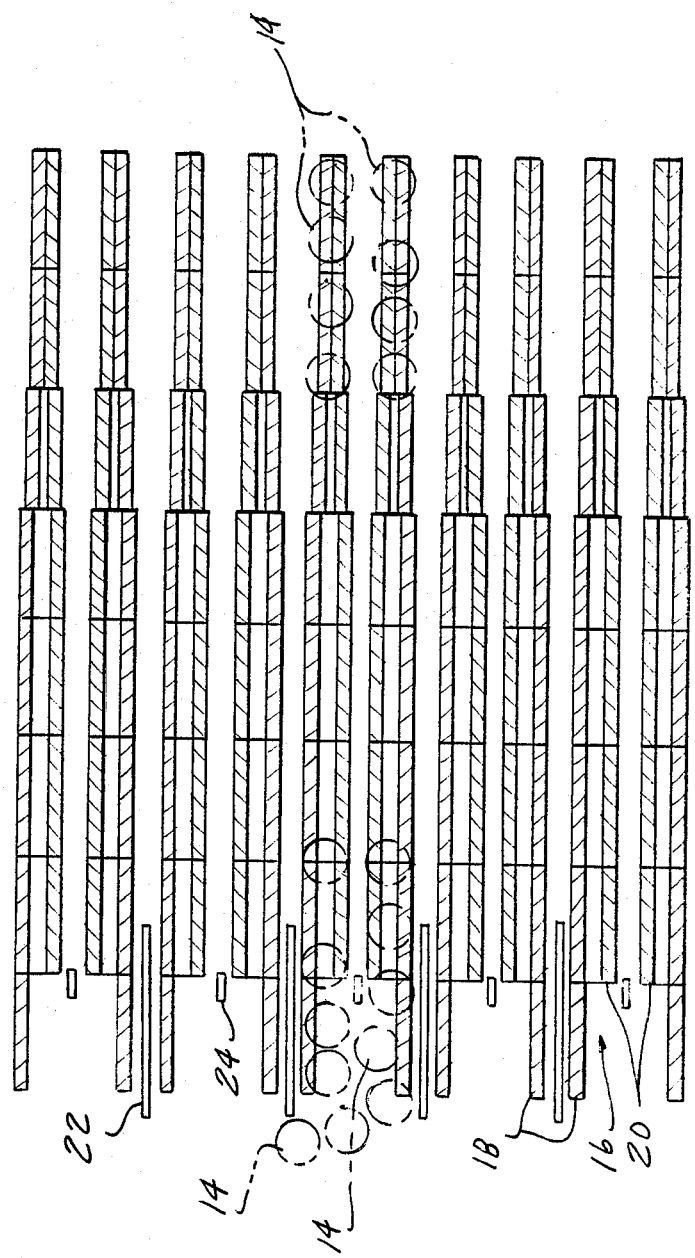

MAGNETIC CAN LANER

BACKGROUND OF THE INVENTION

I. Field of the Invention

The invention relates to an apparatus for orientating a large group of magnetic articles, which are randomly distributed on a conveyor belt, into groups of magnetic articles which are linearly aligned to form rows on the conveyor.

II. Description of the Prior Art

Various types of devices are known in the art for directing flow, diverting, or reorientating conveyed articles on conveyor systems. For example, see U.S. Pat. Nos. 3,738,475; 3,731,782; 3,666,080; 3,433,346; 3,285,386; and 3,214,003. Conveying magnetic articles, such as cans, find numerous applications in industry, such as the can making industry and the handling of canned foods. Can dividers are employed, for example, where cans are received from a machine having a high output and are fed to a plurality of machines operating at a lower speed. Also, can dividers are used to divide cans prior to packing into boxes or cases. In the past, it has been necessary to convey cans between various work stations on single row conveyors, since previous devices and methods for laning cans randomly distributed on conveyor systems have been plagued by jamming problems or have been incapable of operating at the conveyor speed desired.

The present invention addresses these problems by providing an apparatus which is simple in construction and operation. It is a desirable characteristic of the present invention to provide a device which will reorientate magnetic articles randomly distributed across the transverse width of a conveyor system to form predetermined rows of articles at selected transverse positions at a downstream portion of the conveyor system. It is also desirable to provide an apparatus which can operate at relatively high conveyor speeds without jamming the apparatus do to hesitation of the magnetic articles as they pass through the laning apparatus. It is further desirable to provide an apparatus which can be used in conjunction with conventional conveyor systems.

SUMMARY OF THE INVENTION

The invention relates to a magnetic article laner for use with a conveyor having a conveying surface carrying a plurality of magnetic articles randomly distributed across the transverse width of the conveying surface and moving along a path of travel. The magnetic article laner includes magnetic means for laning the plurality of magnetic articles into a predetermined transverse position on the width of the conveying surface defining a lane or row of magnetic articles having a predetermined linear path of travel downstream of the magnetic article laner. The magnetic means are disposed in a plane parallel to the path of travel and vertically spaced from the plurality of magnetic articles. The magnetic means also include north and south magnetic poles defining transverse boundaries of the magnetic lane. An upstream portion the magnetic lane has the north and south magnetic poles transversely spaced from one another, and the magnetic field is tapered or reduced at a downstream portion of the magnetic lane. The plurality of magnetic articles are urged by magnetic forces to form a uniform row centered between the north and south magnetic poles of the magnetic lane.

The invention also includes divider means for assisting the magnetic lanes and aligning the plurality of magnetic articles into predetermined transverse positions on the conveying surface. The divider means are disposed at the boundaries between two adjacent magnetic lanes. Preferably, the adjacent magnetic lanes have adjacent magnetic poles of identical polarity disposed adjacent the transverse boundary between the adjacent magnetic lanes. The divider means can include first divider means disposed adjacent the upstream portion of the magnetic lane for dividing the plurality of magnetic articles into rows having a transverse width greater than two magnetic articles and less than three magnetic articles. The first divider means are preferably disposed at the boundary between two adjacent lanes having the same polarity, such as for example two north magnetic poles disposed adjacent the transverse boundary between the two adjacent magnetic lanes. The divider means can further include a second divider means transversely disposed midway between two adjacent first divider means for assisting the magnetic lanes and dividing the plurality of magnetic articles to form two rows at predetermined transverse positions, each row having a transverse width approximately equal to one magnetic article. Preferably, the second divider means are disposed on a boundary between two adjacent magnetic lanes having the same polarity which is opposite from the polarity adjacent the first divider means, such as for example two south magnetic poles disposed adjacent the transverse boundary between the two adjacent magnetic lanes.

In another embodiment, the invention further includes vibration means for vibrating the divider means to reduce hesitation of the plurality of magnetic articles while moving past the divider means.

BRIEF DESCRIPTION OF THE DRAWINGS

The various features, advantages and uses of the present invention will become more apparent by referring to the following detailed description and drawing in which:

FIG. 4 is a plan view of a plurality of magnetic lanes for the magnetic article laner shown in FIG. 1.

DESCRIPTION OF PREFERRED EMBODIMENT

Figure 1:
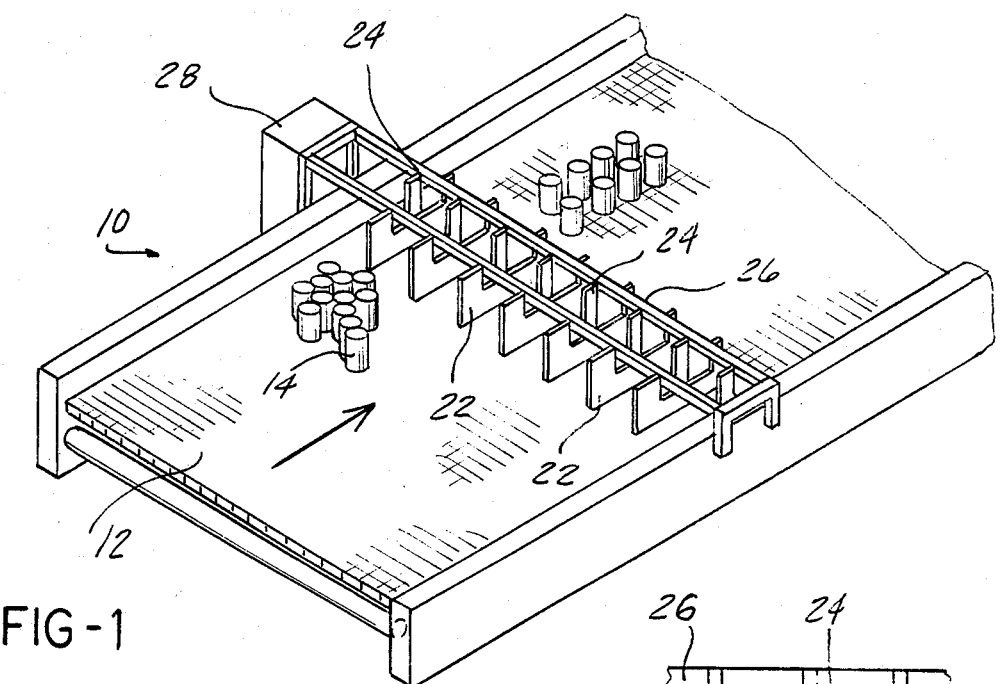
FIG. 1 is a perspective view of a preferred embodiment of a magnetic article laner.
Figure 2:
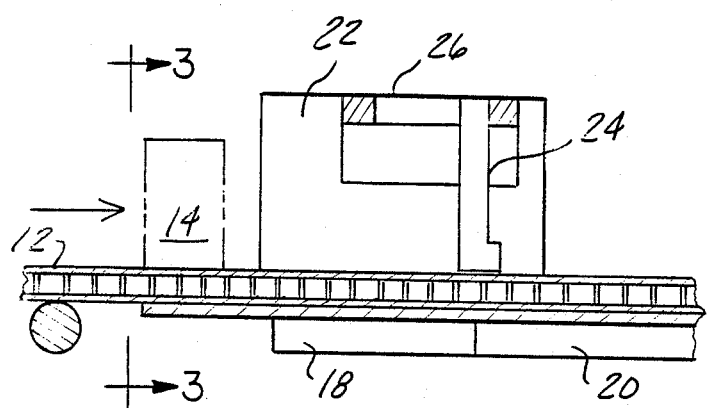
FIG. 2 is a side view of the preferred embodiment of the magnetic article laner shown in FIG. 1.
Figure 3:
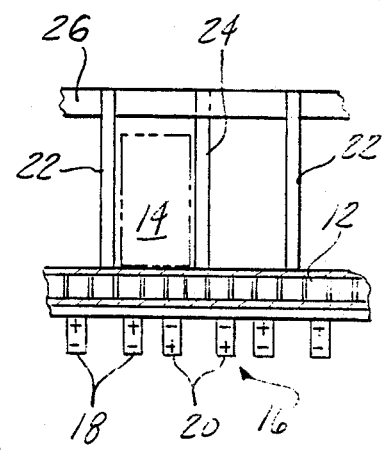
FIG. 3 is a partial upstream view of the magnetic article laner shown in FIGS. 1 and 2.

The magnetic article laner of the present invention is shown in perspective in FIG. 1. For purposes of illustrating the invention, the following description will detail various aspects of the invention with reference to a particular application and use of the invention, such as laning empty cans as the cans are conveyed between a forming machine to a sterilizing or filling station. It should be recognized that this particular application of the invention is for illustrative purposes and should not be construed as limiting the scope of application of the invention with respect to other uses. FIG. 1 shows a conventional conveyor system, designated generally as 10. The conveyor system 10 has a conveying surface 12 carrying a plurality of magnetic articles, such as cans 14, randomly distributed across a transverse width of the conveying surface 12. The plurality of cans 14 are moved by the conveying surface 12 in a generally planar direction of travel approaching the magnetic can laner from an upstream position in no particular order or arrangement. Magnetic means, shown in FIGS. 2, 3, and 4, are disposed in a plane parallel to the direction of travel and vertically spaced from the plurality of cans. The magnetic means are for aligning the plurality of magnetic articles into a predetermined transverse position on the conveying surface defining a lane 16. The magnetic means include north and south magnetic poles defining transverse boundaries of the magnetic lane 16. An upstream portion of the magnetic lane 16 has the north and south magnetic poles transversely spaced from one another. The magnetic field is tapered or reduced at a downstream portion of the magnetic lane 16. This can be accomplished in numerous ways, such as for example the north and south magnetic poles can be tapered toward one another until disposed side by side at a downstream portion of the magnetic lane 16, or the strength of the magnetic field can be reduced by reducing the size of the magnets. The magnetic articles, such as a plurality of cans 14, are urged by magnetic forces to form a row of magnetic articles centered between the north and south magnetic poles of the magnetic lane 16. It should be apparent that one or more magnetic lanes may be formed on a conveying surface 12 depending upon the transverse width of the conveying surface 12, the dimensions of the magnetic article, and the particular application or result desired.

In an embodiment having more than one magnetic lane 16, it is preferable to position adjacent magnetic lanes 16 with adjacent magnetic poles of identical polarity disposed adjacent to the transverse boundary between the adjacent magnetic lanes 16. As can be seen in FIG. 4, this results in polarities of two adjacent lanes of north polarity-south polarity-south polarity-north polarity, or south polarity-north polarity-north polarity-south polarity depending on the starting lane selected.

Divider means are provided for assisting the magnetic lanes and aligning the plurality of magnetic articles into preselected lanes 16 at predetermined transverse positions across the width of the conveying surface 12. The divider means are disposed at the transverse boundary between two adjacent magnetic lanes 16. In an embodiment having more than two lanes the divider means can include first divider means disposed adjacent the upstream portion of the magnetic lane 16 for dividing the plurality of magnetic articles into rows having a transverse width greater than two magnetic articles and less than three magnetic articles. In the application of the invention to a plurality of cans, it has been found that the optimum transverse width between two adjacent first divider means is approximately 2.27734 times the diameter of the can passing through the magnetic can laner plus the thickness or transverse width of a second divider means described in greater detail below. Preferably, the first divider means can include a plurality of first divider members 22, each first divider member 22 having a generally planar shape disposed parallel to the direction of travel and perpendicular to the conveying surface. The first divider members 22 have an upstream edge and a downstream edge with respect to the direction of travel. In the case of more than two magnetic lanes 16, the divider means may also include second divider means transversely disposed midway between two adjacent first divider means to bisect the transverse width between the first divider means. The second divider means is also preferably disposed between the upstream edge and the downstream edge of the first divider means for assisting the magnetic lane 16 in orientating the plurality of magnetic articles to form two rows at predetermined transverse positions on the conveying surface. Preferably, an upstream edge of the second divider means is disposed at a spaced distance downstream from the upstream edge of the first divider means. The second divider means can include a second divider member 24 having a generally planar shape disposed parallel to the direction of travel and perpendicular to the conveying surface. The first and second divider means can be supported from a frame 26 disposed above the conveyor system transversing the width of the conveyor surface. The frame 26 can be constructed of $1'' \times 1''$ frame members and the dividers 22, 24 can be made from 11 gauge, non-ferrous flat plate having approximately $\frac{1}{8}''$ thickness, which are welded to the frame members.

The magnetic means can include a plurality of magnetic members, either permanent or electromagnetic members, spaced vertically from the first and second divider means. Each of the plurality of magnetic members have a north magnetic pole surface and a south magnetic pole surface. The magnetic members disposed adjacent the upstream edge on each side of the first divider means have the same magnetic pole surface facing the plurality of cans. The magnetic members disposed adjacent each side of the second divider means preferably have the same magnetic pole surface facing the plurality of cans which is of opposite polarity to the magnetic pole surface of the magnetic members adjacent the first divider means. The transverse spacing between the north and south magnetic pole faces of the magnetic members in a magnetic lane depends on the dimensions of the magnetic article. In the case of a plurality of cans, the transverse dimension is selected to stabilize the can to prevent the can from tipping as it passes through the magnetic can laner. In the specific application depicted in FIGS. 2-4, the transverse dimension is approximately equal to the diameter of a can passing through the magnetic can laner adjacent the upstream portion of the magnetic lanes. The magnetic field generated by the magnetic members of the magnetic lane is reduced in strength or weakened in the downstream direction. The weakened magnetic field can be produced by reducing the transverse distance between the magnetic members until disposed side by side at a downstream portion of the magnetic lane or by reducing the size or strength of the magnetic members. If the group of magnetic members having the north magnetic pole surface facing the magnetic articles extend upstream farther than the south magnetic pole surface magnets, to a position adjacent and slightly downstream of the upstream edge of the first divider member 22 as shown in FIG. 4, then the group of magnetic members having the south magnetic pole surface facing the magnetic articles are disposed adjacent to and slightly downstream of the upstream edge of the second divider members 24. It should be understood that the magnetic polarity of the magnetic members can be opposite from that described above without affecting the performance of the magnetic can laner.

In high volume applications, the magnetic can laner preferably includes vibration means 28 for vibrating the divider means to reduce hesitation of the plurality of cans as the cans travel around the divider means. The vibration means 28 can be fit to a frame 26 supporting the first and second divider means. The vibration means 28 can include a pneumatically driven vibration device preferably having a high amplitude and low vibration. It has been found that the use of the magnetic can laner described above including the first and second divider members 22, 24 and vibration means 28 for vibrating the first and second divider members can satisfactorily perform the alignment of the plurality of cans into rows having predetermined transverse positions along the width of the conveyor surface on a conveyor surface traveling at variable speeds up to 13 feet per second, wherein a can will not hesitate for more than one tenth (1/10) of a second before proceeding on through the magnetic can laner into an appropriate row.

The magnetic article laner described above operates according to the following method in performing its function. A plurality of magnetic articles are randomly distributed across a transverse width of a conveying surface. The conveying surface is moved along a fixed path to pass the plurality of magnetic articles through magnetic flux lines from a magnetic article laner. The plurality of magnetic articles are magnetically aligned into a lane defined at a predetermined transverse position on the conveying surface. The plurality of magnetic articles are magnetically channeled between north and south magnetic poles defining transverse boundaries of the lane of the magnetic article laner. The plurality of magnetic articles are divided with a plurality of first divider members evenly spaced from each other transversely across the conveying surface such that a distance between two adjacent first divider members is greater than two times a dimensional width of the magnetic article and less than three times the dimensional width of the magnetic article. The magnetic alignment of the plurality of magnetic articles is further assisted with a plurality of second divider members disposed transversely between adjacent first divider members and spaced downstream from an upstream edge of the first divider members. Additional embodiments include the step of vibrating the first divider members to reduce hesitation of the plurality of magnetic articles passing around the first divider members and/or vibrating the second divider members to reduce hesitation of the plurality of magnetic articles passing around the second divider members.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures.

What is claimed is:

1. A magnetic article laner for use with a conveyor having a conveying surface carrying a plurality of magnetic articles randomly distributed at transverse positions on said conveying surface and moving along a path of travel comprising:

magnetic means, disposed in a plane parallel to said path of travel and vertically spaced from said conveying surface, for aligning said plurality of magnetic articles into lanes with preselected linear paths of travel, each lane having first and second magnetic poles of opposite polarity disposed respectively adjacent first and second transversely spaced lane boundaries, wherein adjacent magnetic lanes have adjacent magnetic poles of identical polarity disposed adjacent a common lane boundary each of said magnetic lanes further having a magnetic field of diminishing strength downstream from divider means; and said divider means, disposed adjacent said lane boundaries, for diverting said magnetic articles into aligned rows parallel to said path of travel in cooperation with said magnetic means.

2. A magnetic article laner for use with a conveyor having a conveying surface carrying a plurality of magnetic articles randomly distributed at transverse positions on said conveying surface and moving along a path of travel comprising:

magnetic means, disposed in a plane parallel to said path of travel and vertically spaced from said conveying surface, for aligning said plurality of magnetic articles into lanes with preselected linear paths of travel, each lane having first and second magnetic poles of opposite polarity disposed respectively adjacent first and second transversely spaced lane boundaries;

divider means, disposed adjacent said lane boundaries, for diverting said magnetic articles into aligned rows parallel to said path of travel in cooperation with said magnetic means; and wherein the magnetic means further comprises a plurality of magnetic members aligned generally parallel to said path of travel forming elongated magnetic lanes, wherein adjacent magnetic lanes have adjacent magnetic poles of identical polarity disposed adjacent a common lane boundary, and each of said magnetic lanes further having a magnetic field of diminishing strength downstream from said divider means.

3. The magnetic article laner of claim 2, wherein said divider means further comprises:

first divider members, disposed on said first boundaries and transversely spaced from one another a distance greater than two times a transverse dimension of the magnetic article and less than three times the transverse dimension of the magnetic article, said first divider members further having an upstream edge and a downstream edge with respect to said path of travel.

4. The magnetic article laner of claim 3, wherein said divider means further comprises:

second divider members, disposed on said second boundaries midway between two adjacent first divider members.

5. The magnetic article laner of claim 4, further comprising:

vibration means for vibrating said first and second divider means to assist said plurality of magnetic articles to move around said first and second divider means.

6. The magnetic article laner of claim 2, wherein said magnetic articles comprise can traveling in an upright position on said conveying surface.

7. A magnetic can laner for use with a conveyor having a conveying surface carrying a plurality of cans randomly distributed at transverse positions on said conveying surface and moving along a path of travel, comprising:

magnetic means, disposed in a plane parallel to said path of travel and vertically spaced from said conveying surface for aligning said plurality of cans into lanes having preselected linear paths of travel, said magnetic means including a plurality of elongated magnetic lanes disposed generally parallel to said path of travel, each of said magnetic lanes including north and south magnetic poles defining transversely spaced boundaries of each magnetic lane, wherein adjacent magnetic lanes have adjacent magnetic poles of identical polarity disposed adjacent a common boundary between said adjacent magnetic lanes, said plurality of magnetic lanes having an upstream portion and a downstream portion with respect to said path of travel, each of said magnetic lanes having a magnetic field of diminishing strength along the path of travel, said plurality of cans urged by magnetic forces to align and form rows centered between said north and south magnetic poles of each magnetic lane; and divider means, disposed adjacent said upstream portion of said magnetic lanes and on said boundaries between said adjacent lanes, for diverting said plurality of cans into aligned rows in cooperation with said magnetic means.

8. The magnetic can laner of claim 7, wherein said divider means further comprises:

a plurality of first divider members, each having a generally planar shape disposed parallel to the direction of travel and perpendicular to said conveying surface, said first divider members having an upstream edge and a downstream edge with respect to said path of travel, said first divider members evenly spaced from each other transversely across said conveying surface such that a distance between two adjacent first divider members is greater than two can diameters and less than three can diameters, each of said first divider members disposed on a common boundary between adjacent magnetic lanes having identical magnetic poles of each magnetic lane adjacent the boundary.

9. The magnetic can laner of claim 8, wherein the divider means further comprises:

a plurality of second divider members disposed between two adjacent first divider members to bisect said distance and disposed between said upstream edges and said downstream edges of said two adjacent first divider members, each of said second divider members disposed on a common boundary between adjacent magnetic lanes having identical magnetic poles of each magnetic lane adjacent the boundary.

10. The magnetic can laner of claim 7, further comprising:

vibration means for vibrating said divider means to reduce hesitation of said plurality of cans while moving around said divider means.

11. A magnetic can laner for use with a conveyor having a conveying surface carrying a plurality of cans randomly distributed at transverse positions along said conveying surface moving in a direction of travel comprising:

a frame supported above said conveyor transversing said conveying surface;

a plurality of first divider members supported from said frame, each having a generally planar shape disposed parallel to said direction of travel and perpendicular to said conveying surface, said first divider members having an upstream edge and a downstream edge with respect to said direction of travel said first divider members evenly spaced from each other transversely across said conveying surface such that a distance between two adjacent first divider members is greater than two can diameters and less than three can diameters;

a plurality of second divider members supported from said frame, each second divider member disposed between two adjacent first divider members to bisect said distance and disposed between said upstream edge and said downstream edge of said two adjacent first divider members;

a plurality of magnetic members spaced vertically from said first and second divider members, said magnetic members disposed adjacent said upstream edge on each side of said first divider member having a first magnetic pole surface facing said plurality of cans, said magnetic members disposed adjacent each side of said second divider members having a second magnetic pole surface of opposite polarity from said first magnetic pole surface facing said plurality of cans, said plurality of cans urged by magnetic forces to form aligned rows centered with respect to said first and second magnetic pole surfaces between adjacent first and second divider members and urged by magnetic forces from said adjacent magnetic surfaces of similarly polarity on each side of said first and second divider members to stabilize said plurality of cans against tipping while passing around said first and second divider members, said first and second magnetic pole surfaces spaced from one another adjacent an upstream portion of said magnetic can laner and tapered toward one another until said first and second magnetic pole surfaces are side by side adjacent a downstream portion of said magnetic can laner to reduce magnetic field strength at the downstream portion of said magnetic can laner; and vibration means connected to said frame for vibrating said first and second divider members to reduce hesitation of said plurality of cans as said plurality of cans pass by said first and second divider members.

12. A method for laning a plurality of magnetic articles from a randomly distributed pattern across a transverse width of a conveying surface into aligned rows comprising the steps of:

moving the conveying surface along a fixed path;

dividing the plurality of magnetic articles with a plurality of divider members evenly spaced from each other transversely across the conveying surface;

magnetically stabilizing the plurality of magnetic articles against tipping while said plurality of magnetic articles pass around said plurality of divider members, wherein a plurality of magnetic members form elongated magnetic lanes generally parallel to the fixed path, the plurality of magnetic members disposed in a plane parallel to the fixed path and vertically spaced from the conveying surface, each lane having first and second magnetic poles of opposite polarity disposed respectively adjacent first and second transversely spaced lane boundaries, wherein adjacent magnetic lanes have adjacent magnetic poles of identical polarity disposed adjacent a common lane boundary, such that adjacent magnetic poles of identical polarity are disposed on opposite sides of said divider members and disposed downstream from an upstream edge of said divider members;

diminishing the strength of a magnetic field formed by each of said magnetic lanes downstream from said divider means; and magnetically channeling the plurality of magnetic articles between magnetic poles of opposite polarity defining the transverse boundaries of magnetic lanes downstream of the divider members at predetermined transverse positions on the conveying surface.

13. The method of claim 12 further comprising the step of:

dividing the plurality of magnetic articles with a plurality of first divider members evenly spaced from each other transversely across the conveying surface such that a distance between two adjacent first divider members is greater than two times a dimensional width of the magnetic article and less than three times the dimensional width of the magnetic article.

14. The method of claim 13 further comprising the step of:

assisting the magnetic alignment of the plurality of magnetic articles with a plurality of second divider members disposed transversely between adjacent first divider members and spaced downstream from an upstream edge of the first divider members.

15. The method of claim 14 further comprising the step of:

vibrating the first divider members to reduce hesitation of the plurality of magnetic articles passing around the first divider members.

16. The method of claim 15 further comprising the step of:

vibrating the second divider members to reduce hesitation of the plurality of magnetic articles passing around the second divider members.

* * * * *